J. P. CLIFFORD.
AIR GAS MACHINE.
No. 10,545. Reissued Dec. 23, 1884.
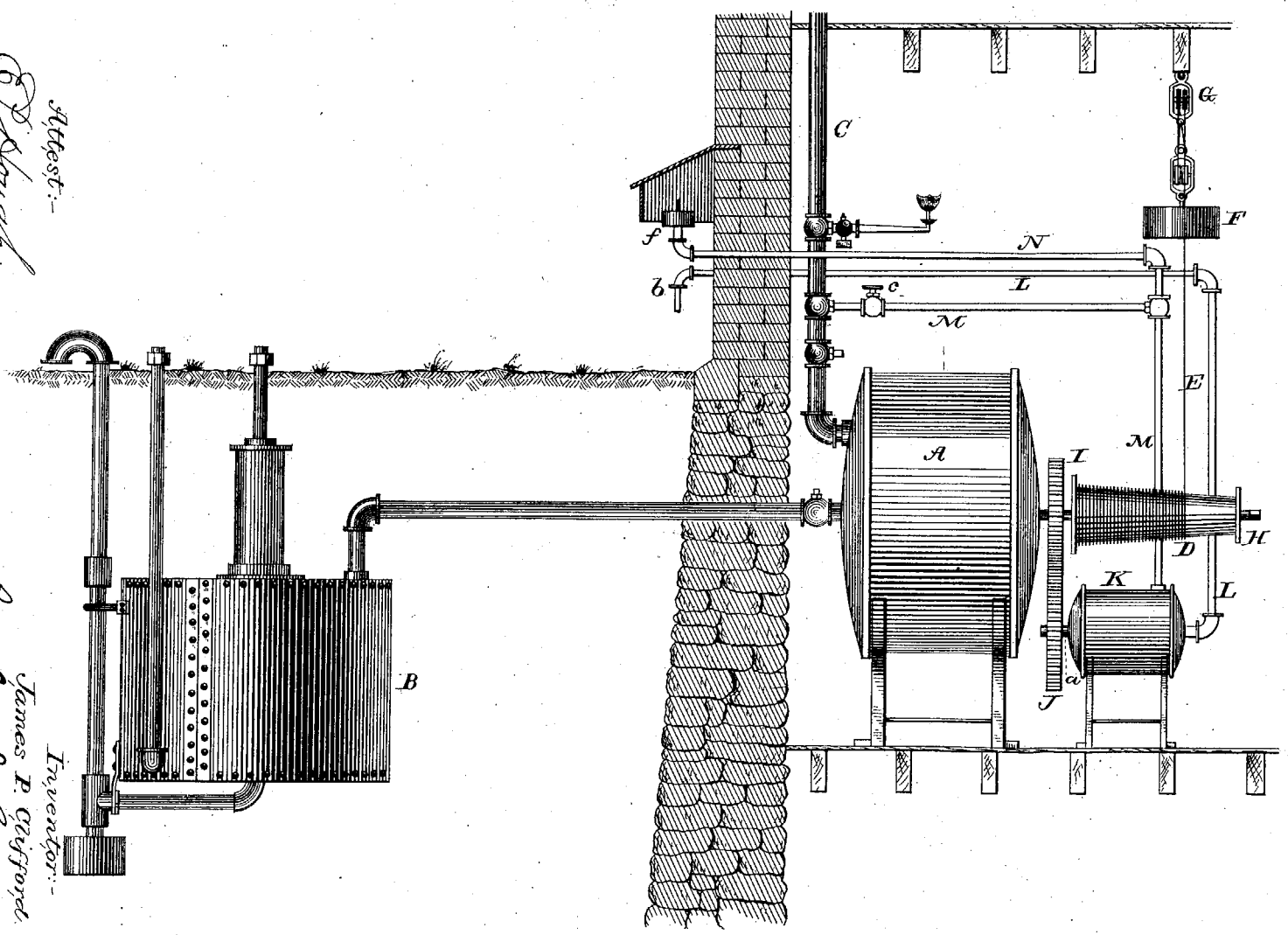
Attest:-
E. P. Hough
C. E. Jones.
Inventor:-
James P. Clifford.
By Chas J. Gooch
attorney
N. PETERS, Photo-Lithographer, Washington, D. C.

UNITED STATES PATENT OFFICE.

JAMES P. CLIFFORD, OF NEW HAVEN, CONNECTICUT.

AIR-GAS MACHINE.

SPECIFICATION forming part of Reissued Letters Patent No. 10,545, dated December 23, 1884.

Original No. 257,848, dated May 16, 1882. Application for reissue filed April 19, 1884.

*To all whom it may concern:*

Be it known that I, JAMES P. CLIFFORD, a citizen of the United States of America, residing at New Haven, in the county of New Haven and State of Connecticut, have invented certain new and useful Improvements in Air-Gas Machines, of which the following is a specification, reference being had therein to the accompanying drawing.

This invention relates to that class of "air-gas machines," so termed, in which atmospheric air is charged or saturated with the vapor of a light hydrocarbon—such, for example, as gasoline. In such apparatus it frequently occurs that when the tank is first filled the air becomes charged with a proportion of the hydrocarbon vapor in excess of what is required for the production of a high grade of illuminating-gas, which not only results in the waste of the hydrocarbon material, but in a smoky flame.

The object of this invention is to provide a convenient and effective means of diluting the gas when thus charged to excess; and it comprises certain novel combinations of parts whereby an additional quantity of atmospheric air may be mingled with the gas as the same is passed through the conducting-pipes toward the burners.

The drawing is a side elevation representing an air-gas machine provided with my said invention.

The gas-machine itself may be of any ordinary or suitable construction, provided with a pump, A, which draws the air-gas or carbureted air from the tank B and forces it to the conducting pipe or main C in a manner well understood in the art, and therefore requiring no specific description here. The conducting pipe or main C connects with the usual or any suitable burners by branch pipes or connections. Motion is given to the moving parts of the pump A by a conical drum, D, actuated by a cord or rope, E, and weight F, the cord or rope E passing over a suitable pulley or pulleys, G, these parts also being of ordinary and well-known construction. Upon the shaft H of the drum D—that is to say, of the pump A—is a spur-wheel, I, which gears with another spur-wheel, J, placed upon the shaft *a* of a pump, K, which may be of the same construction as the pump A, but of smaller size. The inlet of this pump K connects by a pipe, L, with the outer atmosphere, as shown at *b*, while the outlet of said pump K connects by a pipe, M, with the main or conducting pipe C. In the pipe M is a cock, *c*, by which the passage through the said pipe M may be throttled to a greater or less degree, as may be required, or may be entirely closed, the said cock *c* being provided with the usual hand-wheel. Extending from the pipe M to the outer atmosphere is a branch pipe, N, the outer end of which is provided with a valve, *f*, corresponding to a safety-valve, or, in lieu thereof, dips into a vessel filled with mercury, which serves the same purpose.

The pump A and the gas-machine itself being put in operation in the usual manner, the movement of the drum D, which actuates the moving parts of the pump A, actuates in like manner the moving parts of the smaller pump K, thereby causing the said smaller pump K to draw in atmospheric air through the pipe L and expel it through the pipe M into the conducting pipe or main C simultaneously with the flow through the latter of the air-gas or carbureted air, whereupon the air from the pump K, mingling with the air-gas or carbureted air from the pump A, reduces the relative portion of the hydrocarbon in the said air-gas or carbureted air to the degree requisite in a rich but clear-burning gas, the proportion of air thus admitted to the pipe C being controlled by adjusting the valve *c*. When the proportion of hydrocarbon in the air-gas or carbureted air drawn into the pump A from the tank B through the pipe *d* reaches or falls below the proportion required for a rich and clear-burning gas, the valve *c* is operated to entirely close the pipe M, thereby shutting out the access of air from the pump K to the conducting pipe or main C, in which case the air propelled from the pump K is caused to pass through the branch pipe N and out into the outer atmosphere at *f*, the valve or mercurial seal being so adjusted as to permit this outflow of the air when the force of the pump K is applied to drive the air through the branch pipe N, and yet to prevent the outflow through the branch pipe N when the valve *c* is adjusted to permit the outflow from the pump K through the pipe M to the conducting pipe or main C.

By the means described I provide a very superior means, both in efficiency and in convenience of use, for controlling the proportions of hydrocarbon vapor in the air-gas or carbureted air within the limits necessary to the production of a rich but clear-burning gas.

I do not claim the apparatus set forth in the English patent of Jas. Crutchett, No. 9,416 of 1842, inasmuch as the same does not provide for the adjustment at will of the relative proportion of air to be admitted to and mingled with the gas, and could only be used in connection with a standard quality of gas, such as is ordinarily produced in gas manufactured by the distillation of coal, and is not applicable to the gas of varying quality for which my invention is especially designed, the carbureted air or air-gas hereinbefore referred to changing in quality as it passes to the burners, sometimes within the space of a few minutes, and commonly within the space of an hour, and therefore requiring special means for insuring the introduction of the diluting air to the gas in varying quantities, as circumstances may require.

Having thus described my invention, what I claim is—

1. In an air and gas mixing apparatus, the combination, with the generating-tank B, of a pump, A, connected therewith, suitable pipes connecting said pump with the burners, a shaft, H, projecting from said pump, drum D, mounted upon said shaft, rope E, connected with and adapted to wind upon said drum, weight F, and pulley G, a supplemental pump, K, provided with air-pipes, and having a central shaft, and actuating mechanism adapted to connect the shafts of the respective pumps and secure the rotation thereof in unison, substantially as and for the purpose set forth.

2. In an air and gas mixing apparatus, the combination, with the generating-tank B, of a pump, A, connected therewith, suitable pipes connecting said pump with the burners, a shaft, H, projecting from said pump, drum D, mounted upon said shaft, rope E, connected with and adapted to wind upon said drum, weight F, and pulley G, a supplemental pump, K, having a central shaft having an air-inlet pipe, L, and an outlet-pipe, M, connected to the gas-pipe, and the branch pipe N, having a valve or seal at its outer end, and connecting-gearing mounted upon the shafts of the respective pumps for the purpose of securing their rotation in unison, substantially as set forth.

3. In an air and gas mixing apparatus, an auxiliary air-pump having an air-inlet pipe, L, and an outlet-pipe, M, connected to the gas-pipe, and the branch pipe N, having a valve or seal at its outer end, substantially as and for the purpose set forth.

4. The combination, with the pump A of an air-carbureting or air-gas machine provided with the usual drum, D, of the supplemental air-pump K, connecting actuating mechanism, an air-inlet pipe, L, connecting with the said pump K, and an air-outlet pipe, M, extending from the supplemental pump K to the main or conducting pipe C, which forms the outlet of the pump of the machine, all substantially as and for the purpose herein set forth.

5. The combination of the branch pipe N, having a valve or seal at its outer end, with the pipes M and L, the pump A of the machine, the supplemental pump K, connecting actuating mechanism, and the main or conducting pipe C, the whole arranged for joint use and operation substantially as and for the purpose herein set forth.

JAMES P. CLIFFORD.

Witnesses:
JAMES D. KING,
C. E. BROWN.